United States Patent
Ambrose

(10) Patent No.: US 9,881,519 B2
(45) Date of Patent: *Jan. 30, 2018

(54) HAZARDOUS MATERIAL DETECTOR SIMULATOR AND TRAINING SYSTEM

(71) Applicant: HAZSIM, LLC, Rolling Hills Estates, CA (US)

(72) Inventor: Philip Ambrose, Rolling Hills Estates, CA (US)

(73) Assignee: HAZSIM, LLC, Rolling Hill Estates, CA (US)

( * ) Notice: Subject to any disclaimer, the term of this patent is extended or adjusted under 35 U.S.C. 154(b) by 74 days.

This patent is subject to a terminal disclaimer.

(21) Appl. No.: 14/878,899

(22) Filed: Oct. 8, 2015

(65) Prior Publication Data

US 2016/0086515 A1 Mar. 24, 2016

Related U.S. Application Data

(63) Continuation of application No. 13/774,976, filed on Feb. 22, 2013, now Pat. No. 9,165,475, which is a continuation-in-part of application No. 12/389,284, filed on Feb. 19, 2009, now abandoned.

(60) Provisional application No. 61/030,177, filed on Feb. 20, 2008.

(51) Int. Cl.
*G09B 9/00* (2006.01)
*G09B 19/24* (2006.01)
*G09B 7/00* (2006.01)

(52) U.S. Cl.
CPC .............. *G09B 19/24* (2013.01); *G09B 7/00* (2013.01); *G09B 9/00* (2013.01); *G09B 9/006* (2013.01)

(58) Field of Classification Search
CPC .......... G09B 9/00; G09B 9/003; G09B 9/006; G06F 1/1601
USPC ..... 434/218, 219, 226; 340/309.3, 502, 505; 345/440.1, 629
See application file for complete search history.

(56) References Cited

U.S. PATENT DOCUMENTS

| | | | | |
|---|---|---|---|---|
| 3,293,777 A | * | 12/1966 | Shaw | G06G 7/54 343/846 |
| 3,617,896 A | * | 11/1971 | McCurnin | G06G 7/54 434/218 |
| 3,643,166 A | * | 2/1972 | McCurnin | G01S 1/30 434/218 |
| 4,545,766 A | * | 10/1985 | Schoessow | G09B 9/00 434/218 |
| 4,582,491 A | | 4/1986 | Monteith | |
| 4,673,356 A | | 6/1987 | Schmidt | |

(Continued)

*Primary Examiner* — Robert J Utama
*Assistant Examiner* — Sadaruz Zaman
(74) *Attorney, Agent, or Firm* — One LLP; Jonathan Jaech

(57) ABSTRACT

A system and method for simulating another apparatus provides simulated readings by controlling a simulated display provided to portable simulator clients, such as via a wireless interface. Each simulator client provides detector reading displays for selected environments and allows for two-way interactive response with a master control unit. Simulator clients are configured as modular units comprising a smartphone or similar mass-produced wireless computing device removably integrated with a detector simulator housing and/or keypad interface. The master control unit allows direct control of individual detector displays and scenarios for the simulation.

20 Claims, 14 Drawing Sheets

(56) References Cited

U.S. PATENT DOCUMENTS

| | | | | |
|---|---|---|---|---|
| 4,917,611 | A | * | 4/1990 | Whalen .................. G09B 19/00 |
| | | | | 434/218 |
| 5,219,290 | A | * | 6/1993 | Lapp ....................... G09B 9/00 |
| | | | | 434/226 |
| 5,240,416 | A | | 8/1993 | Bennington |
| 5,304,065 | A | * | 4/1994 | Hurst ....................... G01T 1/16 |
| | | | | 250/370.07 |
| 6,033,225 | A | | 3/2000 | Pike |
| 6,317,039 | B1 | * | 11/2001 | Thomason ....... G08B 13/19621 |
| | | | | 340/505 |
| 6,977,666 | B1 | | 12/2005 | Hedrick |
| 7,377,429 | B2 | * | 5/2008 | Anderson .............. B07C 7/005 |
| | | | | 235/375 |
| 7,424,291 | B1 | * | 9/2008 | Lunsford ........... H04L 12/2827 |
| | | | | 340/309.8 |
| 7,653,883 | B2 | | 1/2010 | Hotelling et al. |
| 7,894,769 | B2 | * | 2/2011 | Ganley ................... H04R 3/00 |
| | | | | 381/122 |
| 2002/0186668 | A1 | | 12/2002 | Thomason |
| 2004/0232323 | A1 | * | 11/2004 | Bosco .................. G01T 1/169 |
| | | | | 250/253 |
| 2006/0281037 | A1 | | 12/2006 | Faber |
| 2007/0172801 | A1 | * | 7/2007 | Darois .................. G09B 19/00 |
| | | | | 434/226 |
| 2008/0024388 | A1 | | 1/2008 | Bruce |
| 2009/0146838 | A1 | * | 6/2009 | Katz ...................... G01D 4/006 |
| | | | | 340/870.02 |
| 2010/0144391 | A1 | * | 6/2010 | Chang ................. G02F 1/13338 |
| | | | | 455/566 |
| 2010/0321170 | A1 | * | 12/2010 | Cooper ................. G02B 27/01 |
| | | | | 340/425.5 |

\* cited by examiner

FIG. 2A

External Display
A small unit which contains a micro-processor, display, and memory which attaches to of-the-shelf meters replacing the display. The Hazardous materials (HazMat) meter simulator display is used in lieu of factory display. External display only used for training purposes.

200

- Hazardous materials (HazMat) meter simulator Compatible
- Hazardous materials (HazMat) meter simulator Interactive Compatible
- Touch Screen Display
- Micro-processor
- Memory
- Rugged external case
- Affixes over meter display
- Display mimics meter
- In place for training

Internal Device
Hazardous materials (HazMat) meter simulator (compatibility) control ability is sent via externally attached connector which controls actual display on off-the-shelf meters. The device is enabled during training purposes only.

- Hazardous materials (HazMat) meter simulator Compatible
- Utilizes actual meter display
- External connector attachment

Stand Alone
Hazardous materials (HazMat) meter simulator interactive training meter which can mimic various meter types. Used for training purposes only.

- Hazardous materials (HazMat) meter simulator Compatible
- Hazardous materials (HazMat) meter simulator Interactive Compatible
- Touch Screen Display
- Micro-processor
- Memory
- Generic meter case
- Display mimics desired meter

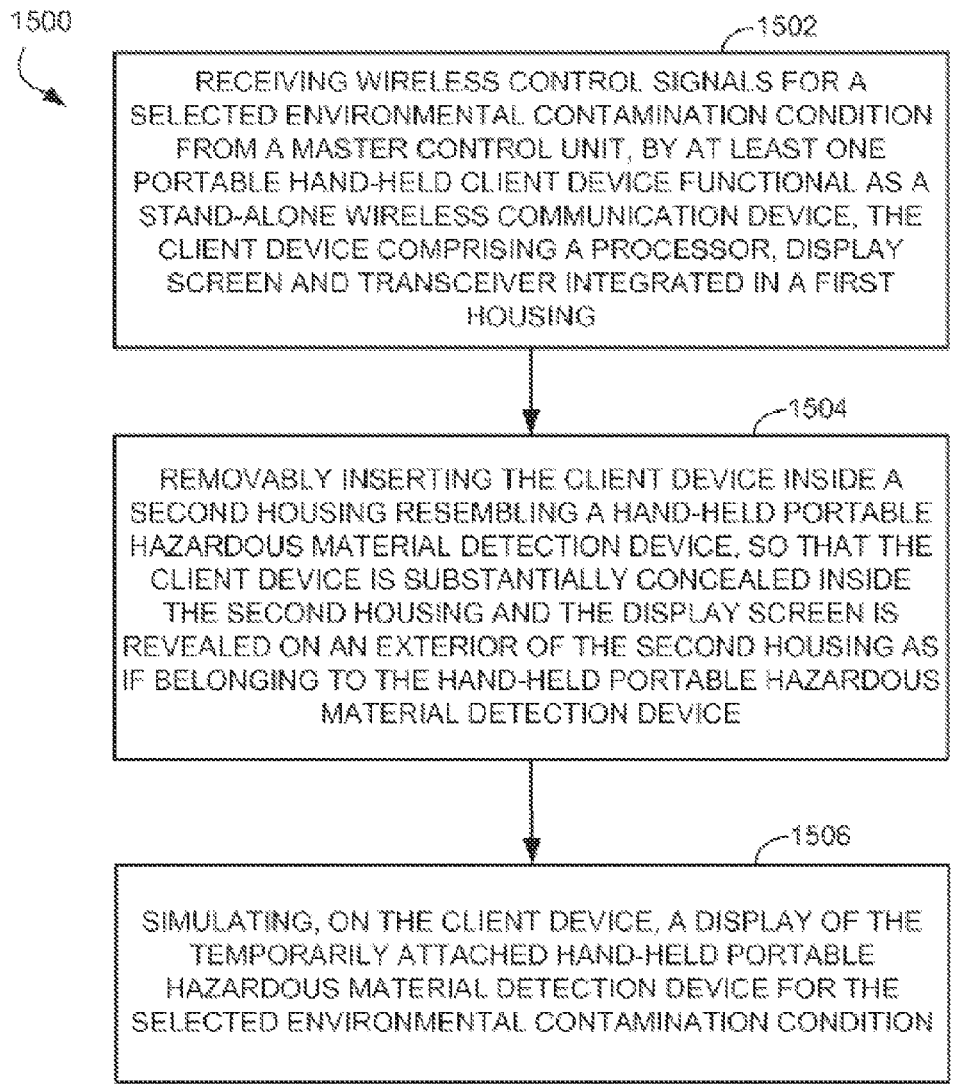

HAZARDOUS MATERIAL DETECTOR SIMULATOR AND TRAINING SYSTEM

CROSS-REFERENCE TO RELATED APPLICATION

This application is a continuation of U.S. non-provisional application Ser. No. 13/774,976, filed Feb. 22, 2013, now U.S. Pat. No. 9,165,475, which is continuation-in-part of U.S. non-provisional application Ser. No. 12/389,284 filed Feb. 19, 2009, which claims priority to U.S. provisional application Ser. No. 61/030,177 filed Feb. 20, 2008, which applications are hereby incorporated by reference, in their entireties.

FIELD

The present application relates to a system and apparatus for simulating readings on portable detection devices through both hardware device and software, such as used, for example, in hazardous materials (HazMat) first responder training.

BACKGROUND

Handheld hazardous materials detection instruments are used for detecting hazards in Chemical, Biological, Radioactive, Nuclear, and Explosive ("CBRNE") environments. Proper interpretation of and reaction to data received on detectors is vital to life safety in a hazardous atmosphere or radioactive material contaminated area. Technology applied to the development of HazMat detectors has increased their functionality. Effective use of detection instruments in emergency conditions rests on adequate operator training. Without adequate training, first responders and others may be placed at risk when an actual incident occurs.

Emergency response agencies from all over the United States utilize grant funds to send personnel to a handful of remote training sites that specialize in certain areas of CBRNE. Those offsite training opportunities result in increased cost to cover personnel with only marginal benefit, given the limited exposure to actual hazardous materials during training. Live fire training (e.g., active burns creating simulated "immediately dangerous to life and health" (IDLH) atmosphere) in the Fire Service are used to establish vital real-life and safety decision skills in an environment that approximates the responder's real world as closely as possible. However, this same model of live training in HazMat, using actual CBRNE agents for training HazMat first responders, is dangerous, expensive, difficult to construct, and unrealistic for most, if not all, municipal fire/hazmat teams. The live agents that are used in training are typically very small amounts in a controlled environment that do not simulate actual distribution of the substance, initial contact with or training stress likely experienced in the field.

Moreover, HazMat detectors cannot safely be equipped with built-in training modes, because of the risk this would create that an operator might confuse detection of actual hazardous materials with readings from a built-in simulator function during an emergency. For this reason, it is preferable to use actual HazMat detectors for training with actual CBRNE agents. If CBRNE training agents cannot be deployed, it is preferable to use separate devices that resemble detectors closely enough to function as training equipment, but different enough to eliminate any serious risk of being confused with actual equipment during an emergency. Supplying "similar but different" equipment may pose special challenges for the design of HazMat detector simulators, raising the cost of supplying effective but safe dedicated HazMat training simulators.

Despite the advantages of offsite and live training or dedicated training equipment, the high cost of offsite training, live training, or dedicated HazMat training equipment may undesirably constrain the number of people who can be trained. A need therefore exists to train front line responders with realistic and real-time simulations using their detection devices or economical dedicated simulators, while keeping the cost of training equipment and personnel to a minimum.

SUMMARY

Methods, apparatus and systems for simulating hazardous materials detection instruments for training purposes are described in detail in the detailed description, and certain aspects are summarized below. This summary and the following detailed description should be interpreted as complementary parts of an integrated disclosure, which parts may include redundant subject matter and/or supplemental subject matter. An omission in either section does not indicate priority or relative importance of any dement described in the integrated application. Differences between the sections may include supplemental disclosures of alternative embodiments, additional details, or alternative descriptions of identical embodiments using different terminology, as should be apparent from the respective disclosures.

Briefly, and in general terms, the present disclosure concerns a computer-based training simulation device and method for improving life-safety skills in the response to hazardous incidents by first responders using a computerized controller, computerized clients, wireless technology, simulation software, simulation data and detector parameters to replicate a hazardous environment without the use of hazardous substances. The system integrates chemical, radioactive, and other hazardous substance parameters to closely replicate responses of HazMat detectors to a hazardous environment.

The computer-based simulation training system may, by enabling more cost-effective and realistic training, improve the response to actual hazardous incidents by first responders. The system may include a master control (trainer) module and one or more client (trainee) modules. The master control and client modules may be implemented as software, firmware, or a combination software/firmware modules installed in a mass-productions computer systems, for example a laptop computer, notepad computer, and/or smartphone which are used in a training scenario to simulate a hazardous atmosphere in real time. The master control module may be installed on a laptop or notepad computer and the client modules on a smaller device having approximately the same display screen size as an actual hazardous materials detector, for example on smartphones or mini-tablet devices. The smartphone or mini-tablet may be inserted into a special housing resembling a HazMat detector, and may be connected to a simulated keypad interface of the housing via a mini-Universal Serial Bus (mini-USB) or similar input connector.

The system can be used to provide individual control of the peripheral units by the master controller, or collective control via a group simulation environment broadcast from the master controller. The system may integrate specific technical functions and readings of various detectors currently on the market that are used to measure chemical, biological, radiological, energetic, or other hazards, or a combination of two or more hazards. In the group simulation environment, the system may emulate the simulated environment throughout multiple devices by controlling each separate simulated parameter of the environment according to a predefined or ad hoc scheme broadcast by the master controller. The scheme may include location-sensitive simulated readings at different detector devices. In an aspect, training questions may be posed to the trainees via the client modules and scored.

In related aspects, a simulated HazMat detection apparatus with a modular processing element may be provided for performing any of the methods and aspects of the methods summarized above. A simulated HazMat detector may include, for example, a housing and physical user interface modeled to look and respond to user input in the manner of a HazMat detector, having a physical mounting interface designed to hold a smartphone/WiFi device with a processor, memory, network interface and display screen, wherein the memory holds instructions for execution by the processor to cause the simulator apparatus to perform operations as described herein. An article of manufacture may be provided, including a non-transitory computer-readable medium holding encoded instructions, which when executed by a processor, may cause a simulator apparatus to perform the methods and aspects of the methods as summarized above.

In an aspect, a HazMat detector simulator for training purposes may incorporate a mass-produced computing unit with a wireless interface in an affordable smartphone or palm computing form factor (e.g., iPhone™, iPod™, Android™ smartphone or tablet device, Windows™ smartphone or tablet device, Linux/Android™ processor, etc.) to perform many or all user interface functions, depending on the design of the detection unit being emulated. The computing unit may also be referred to herein as a "client device." An assembled HazMat detector simulator including the concealed client device may be referred to herein as a "peripheral hazardous materials detector simulator unit," with "peripheral unit" or "simulator unit" used for brevity.

The simulator unit may include a keypad or other physical control panel coupled via a user interface module to an input port of the client device. The simulator unit may include a special mounting system and housing for the client device that conceals the client device except for a selected portion of its display screen in an interior of the simulator unit. The mounting system may be designed to permit ready access to and removal of the client device by the end user without damaging the simulator unit or client device. In the alternative, the mounting system may be designed to make access or removal somewhat difficult so as to require a qualified technician to perform such operations properly and without any damage to the simulator unit or client device. The housing, screen area reveal, and control panel may be designed to resemble or mimic an actual hazardous materials detector unit, or may be designed to be conspicuously different in appearance from an actual unit so as to avoid confusion in emergencies.

An application installed on the client device may receive user input via the input port and/or receive touchscreen input through its display screen or audio input through a microphone, and output realistic and controlled responses simulating a detector on the display screen, without the use of CBRNE agents. In addition, the client device may communicate wirelessly with a master control unit via a built-in wireless connection, such as a Wi-Fi or cellular phone connection. The master control unit may control simulations presented on the client device during a training session and provide training information and test questions after a simulation exercise is completed.

Thus, the hazardous materials detector simulator of the invention may, among other things, provide a more realistic and/or thorough training experience, through which a trainee or experienced HazMat responder using the hazardous materials detector simulator of the invention may more likely pay closer attention to the detector response as well as experience critical decision-making in the simulated HOTZONE. The system allows local fire, police, and emergency response agencies to set up effective life safety training anywhere and at any time without traveling from their district or being exposed to any real hazardous materials. Nationally accepted protocols and local Policy and Procedure may be adapted easily into the training scenarios. Local jurisdictions can set up realistic trainings easily at their own 'Target Hazard' locations, using the simulator. Furthermore, when the simulator unit is not being used for training, the smartphone may readily be removed from the simulator unit and configured as a normal communications device, further reducing equipment costs for the responder agency and eliminating the possibility that the simulator system will be confused with a real detector during an emergency. The simulator unit may be useful for training personnel in other technical specialties, including, for example, industrial HazMat control, confined space safety, laboratory safety, and others concerned with mobile detection of hazardous materials.

Further embodiments, aspects and details of methods, apparatus and systems for simulating HazMat detector are presented in the detailed description that follows.

BRIEF DESCRIPTION OF THE DRAWINGS

The present technology, in accordance with one or more various embodiments, is described in detail with reference to the following figures. The drawings are provided for purposes of illustration only and merely depict typical or example embodiments of the technology. These drawings are provided to facilitate the reader's understanding of the technology and shall not be considered limiting of the breadth, scope, or applicability of the technology.

FIG. 2A illustrates features a hazardous materials detector simulator implemented as a client device attached to a functional HazMat detector.

FIG. 2B illustrates features of a hazardous materials detector simulator implemented as an internal component of a functional HazMat detector.

FIG. 2C illustrates features a hazardous materials detector simulator implemented as a stand alone interactive training detector without functional detection capabilities.

FIG. 15 is a flow chart illustrating a method for simulating a hazardous materials detector using a second housing enclosing a stand-alone client device.

DETAILED DESCRIPTION

The present technology includes novel apparatus and methods of using the novel apparatus to simulate measurement equipment of various types. Although the novel apparatus and methods presented herein are believed useful for training first responders and others in the use of hazardous materials detection equipment, such apparatus and methods are not limited to this application. Training of hazardous material responders is merely an example of a useful application, and other applications for the new technology may also be useful.

Figure 1:
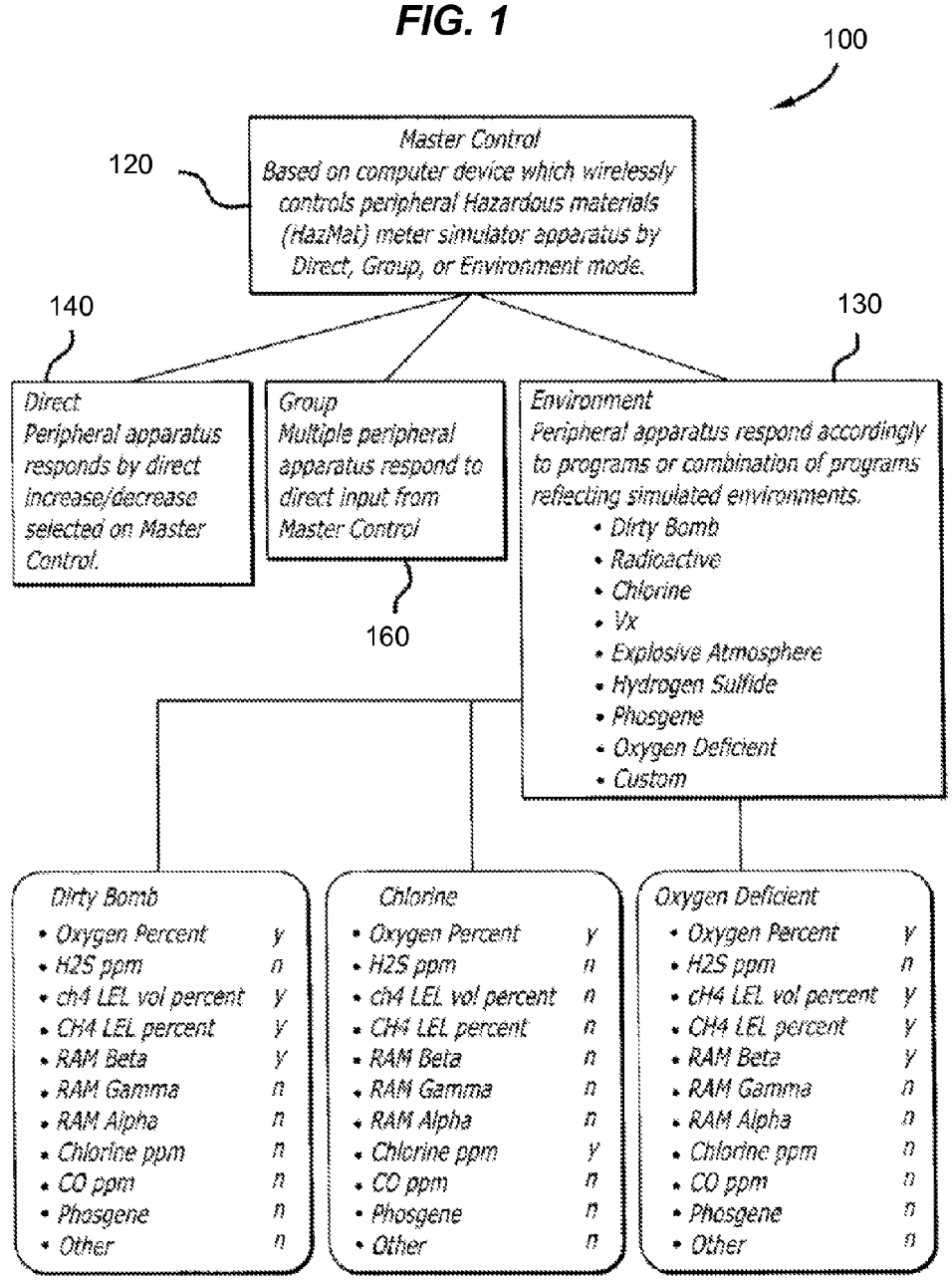
FIG. 1 is a functional block diagram illustrating different control modes for hazardous materials detector simulator client devices under the control of a master control unit.

Referring to FIG. 1, a control system 100 for hazardous materials detector simulation may be accomplished in various control modes. In a direct mode 140, a master control module 120 under the control of an instructor directly controls simulator output at an individual simulator client (peripheral apparatus), for example via a Wi-Fi connection or other wireless link between the control module 120 and the client. In a group control mode 160, the master control module 120 simultaneously or near-simultaneously controls multiple HazMat simulator clients using an ad hoc or predetermined scheme based on instructor input to the master control module, broadcasting or multicasting to the multiple clients via a wireless link. In an autonomous mode 130, one or more pre-programmed training applications operating on each of one or more client devices control outputs from respective client simulator devices for selected environmental settings, such as for dirty bomb contamination, an oxygen deficient environment, and chlorine contamination. For example, simulator readings may be generated using a quasi-random number generator, data table, or other number generator by an application operating on the client device. However, use of the client devices under master controls (modes 140 or 160) with interactivity between an instructor operating the control module and students operating the client modules is believed advantageous in many learning environments.

The hazardous materials (HazMat) detector simulator system 100 enables a client device display to simulate detector readings indicating a hazardous atmosphere environment for training purposes. In general, interactive hazardous simulation training using a hazardous materials detector simulator may be enhanced by interaction with the master control unit, wirelessly controlling the display on each remote unit. A hazardous materials detector simulator enabled unit allows its display to be controlled remotely for training purposes. As a safety feature, the simulator may be rendered inoperable unless under the control of the master control unit, to prevent any chance of being confused with an real detector in time of emergency.

The display device and/or entire simulator client may be externally attached to an actual detector device, incorporated as a module of an actual simulator activated only during training, or modularly inserted or permanently enclosed in a housing simulating a detector. As indicated in FIG. 2A, an externally attached simulator unit 200 may be provided in the form factor of a hand-held unit containing a processor, display and memory (for example, about 3×5 inches in extent) that attaches over and temporarily covers the display screen of an actual detector unit during training sessions only. For example, the external client 200 may dip on and over the display of a working detector. The attached external display of unit 200 is used in lieu of the detector factory display during training, and may be easily removed when training is over. The hazardous materials detector simulator is completely independent of the actual detector unit and during training the user reads the hazardous materials detector simulator display 200 while holding the working detector unit which may be powered off.

Functional HazMat detectors may lack an interface for connecting to an attached external detector and microprocessor, making it difficult or impossible to realistically simulate interactivity via the keypad or other physical user interface device of the actual detector, using the external attached client 200. If the actual detector is designed to use touchscreen input only, the attached external display can accomplish a realistic simulation simply by incorporating touchscreen capability in the external screen. Nonetheless, many HazMat detectors or other such devices, even if including touchscreen capability, may often include selector switches or other electro-mechanical interface components for controlling HazMat sensor electronics and display options. An externally-attached training module 200 may be less suitable for simulating operation of these types of detectors because of the lack of a standard interface for coupling to the detector's physical user interface. However, advantages to the external client 200 form factor may include the ability to incorporate low-cost instead of more ruggedized components, avoiding any requirement to infiltrate the detector and its proprietary specifications, providing ability to control the display coupled to the physical housing of a functional detector, and the fact that with the external client 200 attached a functional hazardous materials detector simulator can readily be recognized as being in a non-functional training mode.

As indicated in FIG. 2B, a simulator client 210 may be provided in the form of an internal component or module of an actual HazMat detector. The simulator client may be automatically rendered inactive unless receiving a signal via a wired or wireless interface from a master control unit, to reduce the risk of confusion during an emergency situation. A prominent external connector for a dongle and/or master control interface may be including in the client 210, which may be configured so that it cannot operate in simulator mode unless the dongle/interface connector is connected to the detector. Advantageously, in this way the simulator and actual detector functions can be contained in the same unit. But for many applications, a combination design may also pose certain disadvantages, such as requiring integration at the design stage of the actual detector, and also requiring that detector be removed from service during training sessions, possibly necessitating the costly acquisition of dedicated detector/simulators. Depending on cost and design particulars, the internal client 210 may not be the most cost-effective solution.

As indicated in FIG. 2C, a third approach may use a stand-alone simulator client 220 designed to have the same or similar "look and feel" as an actual detector, but lacking actual sensors and electronic for HazMat detection. Instead, the stand-alone client 220 may have simplified electronics and software for simulating the operation of a HazMat detector, optionally capable of being controlled by a master control unit. The cost of producing the stand-alone client 220 may be greatly reduced by cleverly incorporating off-the-shelf palm or mink tablet scale computing devices into the design. For example, the stand-alone client 220 may include a display device (optionally touchscreen-enabled) that is part of a smartphone or wireless-equipped palm computing device. The smartphone or palm device also includes a memory holding simulator application software and a processor for executing the software and controlling the display during training. The smartphone or palm device may be modularly inserted into a housing of a detector simulator and coupled via a standard micro-Universal Serial Bus (USB) or other connector to an output of the simulator's physical user interface (e.g., keypad, selector switches, etc.).

Figure 3:
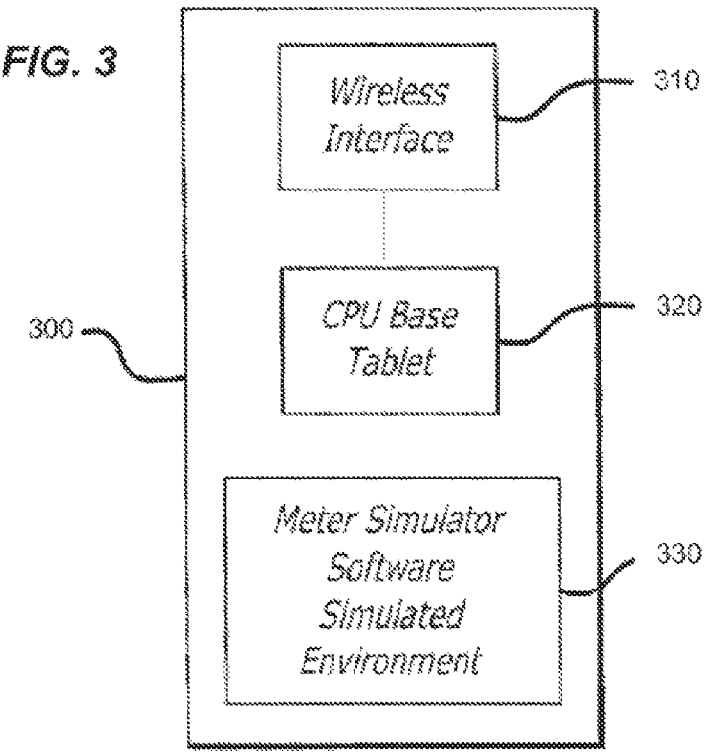
FIG. 3 is a schematic diagram of a hazardous materials detector simulator master control unit implemented as a PDA, notebook computer, tablet computer or smartphone containing software and hardware that controls one or more peripheral units.
Figure 5:
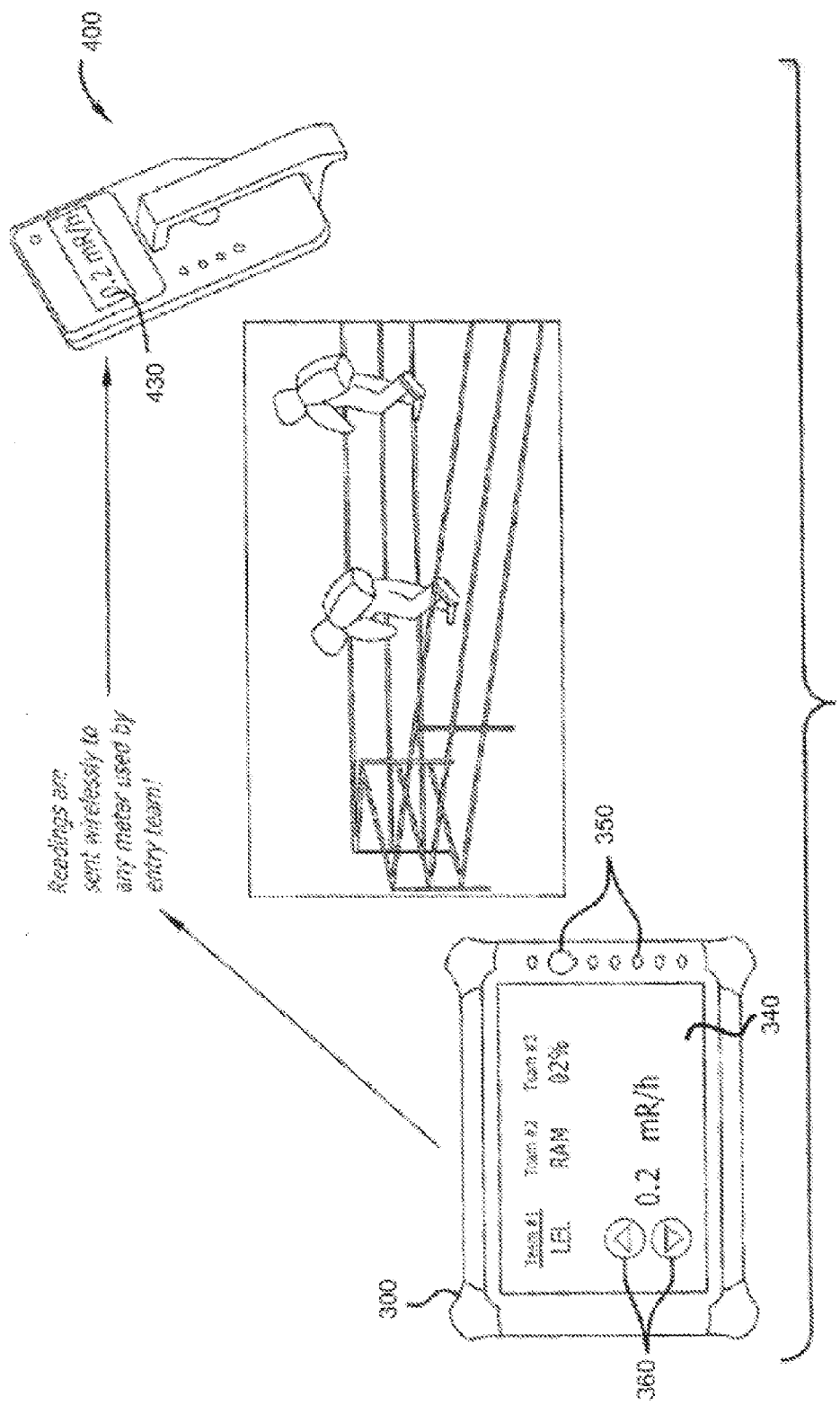
FIG. 5 is a schematic diagram of the hazardous materials detector simulator master control unit and a peripheral hazardous materials detector simulator unit for training HazMat teams.

As shown in FIG. 3, a hazardous materials detector simulator master control unit 300 may include the main computer enabled control processor 320, for example, a processor embodied in a smartphone, palm computer, notebook computer, or tablet computer. The master control unit may further comprise a computer-readable medium or memory 330 containing software for simulating a hazardous environment and interacting with and/or controlling client simulator units. The master control unit 300 may further include a wireless interface 310 coupled to the processor 320 for communicating with client simulator units and a display device 340 (FIG. 5) and/or keypad interface 350 (FIG. 5). All of the components 310, 320, 330 and additional components such as a display may be incorporated in a ruggedized tablet or palm-sized computing device capable of sending wireless signals to one or more of the remote hazardous materials detector simulator devices.

Optionally, the control unit 300 may receive feedback data during an interactive training mode 140, 160, which it may display on a display output device 340. An operations screen 340 on the control unit 300 as shown in the accompanying FIG. 5 may indicate an identifier for one or more client units under control of the master control unit, what type of detector is being simulated, and a simulated measurement readout of the detector. Touch screen 'toggles' or buttons 360 may be visually displayed and in response to touch input from an instructor may send a signal to the remote hazardous materials detector simulator clients changing their display. The control unit 300 may optionally have keypad buttons 350 for a 'type' of environment to be sent to all detectors as a group. For instance: by pressing a button called dirty bomb—simulated radiation detectors on the client may be caused to display detected radiation measurements and a simulator gas detector may pick up residual atmosphere related to an explosion. In addition, the master control unit may control client simulated reading using a simple up or down arrow or other user interface receiving instructor input, with user interface controls for setting a rate and/or increment of simulated measurement change at the client.

Figure 4:
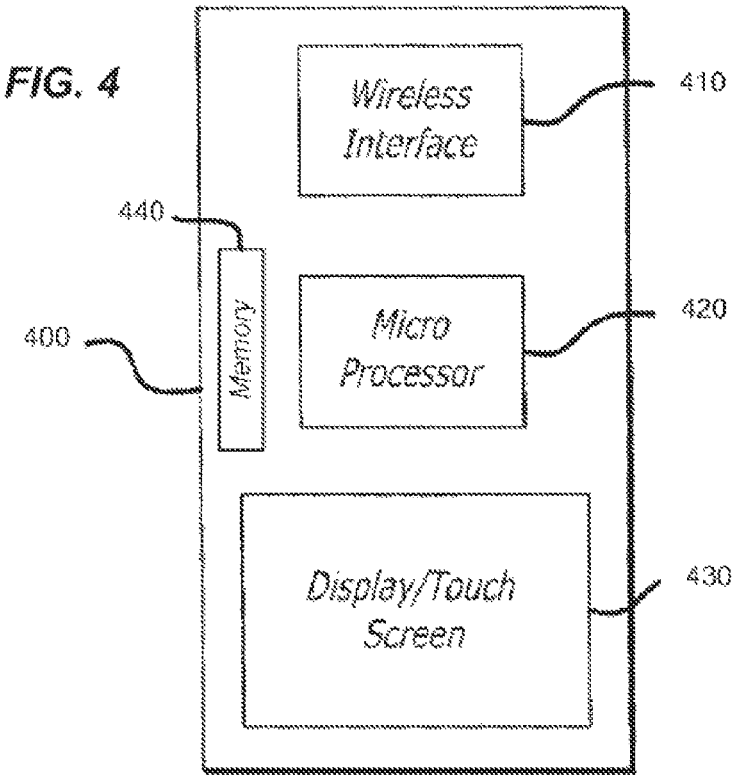
FIG. 4 is a schematic diagram of a hazardous materials detector simulator client or master control unit including a touch screen.

Referring back to FIG. 4, a hazardous materials detector simulator client 400 (peripheral unit) may be provided in any of the form factors described in connection with FIGS. 2A-C. For example, the client 400 may be incorporated as a module of a functional hazardous materials detection device, be made as an external self-contained attachment with display, processor, memory and wireless interface covering and replacing the display of a functional detector, or as a stand-alone dedicated simulator client. Regardless of the form factor, the client display 430 simulates an actual display of a HazMat detector on which it is placed and/or designed to simulate. Built-in memory files preprogrammed based on a functional detector's display may be controlled via wireless interface 410 (e.g., WiFi, infrared, Bluetooth, cellular or other radio link) coupled to a processor 420 in response to signals from a master control unit. The master control unit may control the display on the simulator unit to reflect various environments/readings. The user gets an actual reading on the display and needs to take necessary actions. The master control unit may operate multiple hazardous materials detector simulators simultaneously.

It should be appreciated that a touch-screen device such as the peripheral unit 400 may also be configured as a master control unit by programming the memory 440 with master control unit software instead of client software. However, for many applications a master control unit may benefit from having a larger display screen than can be accommodated within the form factor of a simulated detector client device. Thus, for many applications the master control unit may be provided in a form factor different from, and generally larger than the client device.

A housing for an external client 200 or stand-alone client 220 may be constructed as ruggedized shock proof/water resistant plastic case including a display (LCD) on one side (touch screen option on certain models), a battery, a memory, power switch, microprocessor, wireless receiver (transmitter optional), and an external USB or similar interface port. A display screen 430 may be positioned on one side of the unit as indicated in FIG. 5. The display 430 may be specified to be scratch resistant and weather proof, with adequate resolution to show detector function images. The screen 430 may have adequate glare resistance and backlighting ability. Color is optional, based on cost. In a stand-alone client 220 incorporating a smartphone in a modular fashion, the screen may comprise a color touch-screen and other common smartphone features, such as cellular data capability (e.g., $3^{rd}$ Generation Partnership Program (3GPP) radio access technologies), microphone, front-facing camera, and ample application memory.

A battery (not shown) may also be included in the client 400 of a capacity adequate to supply enough voltage to run the CPU 28 and screen for extended periods between charging and/or battery replacement. Intrinsically safe operation is generally not required, but can be provided if desired. The system may have an optional external charge port.

The memory 440 is coupled to the processor capable of storing screen shots and active screen movies (looped) of each selected detector function. The files are stored based on detector type, model, manufacturer, and desired display. When called upon by the CPU, the memory file will be displayed on the screen.

The processor 420 may include an ability to interface with the wireless signal and pull the appropriate file from memory to be displayed on the screen. Optionally the processor 420 may be required to accept touch screen input from the screen and wirelessly return the data to the master control unit. The processor 420 may receive power and initiate activity upon activation of the power switch. A power switch may be externally located on the side of the unit and be configured as water resistant/proof. External ports may include an external battery charge port and or optional docking, and a data port to processor or memory for updating files and downloading data. Additional ports may be included as needed.

Using an off-the-shelf smartphone or the like in a modular stand-alone client will avoid the costs of engineering and supplying most the hardware components 410, 420, 430 and 440 and related hardware at low volume. Instead, the cost efficiencies of stand-alone mass-produced smartphone or other wireless computing and wireless communication devices (e.g., a hand-held notepad computer equipped with a wireless transceiver) may be exploited in a modular fashion within a housing designed to resemble a functional HazMat detector, including a functional physical user interface (e.g., keypad or switches) if desired. These cost efficiencies may provide an overwhelming advantage for the modular stand-alone design. An example of a modular stand-alone client system is described below in connection with FIGS. 6-12.

In some embodiments, software held in a memory 330 of the master control unit 300 may control the control unit, the peripheral units, and enable interaction between the control unit and peripheral units. The control unit may control all of the displays and interactive features enabled on the peripheral units, and provide a mirrored display (monitor) for each of multiple peripheral unit at the master control unit. For example, the master control unit may show client monitor displays in separate windows or tiles of a master control screen. Features of master control unit software may include direct control of individual peripheral units, scenario parallel or collective control of multiple peripheral unit, interactive features (e.g., messaging, chat, or answer scoring) and data logging.

Under direct control, the control unit may directly control and toggle a monitor display for one or more peripheral units, in response to control panel (e.g., keypad) or touch-screen input from the instructor. An input (e.g. increased mR/hr) given on the control unit may send a wireless transmission to the peripheral unit. The peripheral unit receives the signal, which it may translate into a display of the appropriate image or video showing the increased reading.

Under scenario control for parallel or collective control of multiple peripheral units, a training officer or other person operating the master control unit selects a type of environment from a menu of predefined types via the master control. Instead of direct control of each client device individually, the training officer can select an overall environment (e.g., post blast of dirty bomb). Each predefined type may include a defined group of simulated detector readings selected to represent a particular type of hazardous environment. This environment 'group' may be used to control each peripheral device appropriately to simulate a potentially complex environment. Multiple peripheral devices are used at the same time and each will respond in a parallel or collective fashion, optionally controlled individually based on a current location of each peripheral unit as determined by a position sensor on each client. The types of scenario environments may include, but are not limited to, normal background, radioactive, chemical, explosive, and any combination thereof.

It should be appreciated that the use of a cellular wireless link and/or Internet connection between the master control unit and each client device may permit a group exercise to be conducted over a large geographic area anyway within range of a cellular network. For example, each client unit may be dispersed 0-10 miles, 10-100 miles or even 100-1000 miles from the master control unit and/or from other client devices participating in a training exercise. Thus, effects of different scenarios may be accurately simulated over large geographic areas. Incorporation of modular smartphone client units may thus enable effective wide-dispersal training at a modest cost. Of course, the smartphone client may support other wireless technologies, for example Bluetooth™ or WiFi. Communication between the master control unit and the client devices may use any available wireless technology supported by the control unit and client devices.

During a training scenario, master control software may first determine how many and what type of simulated detectors are going to be used in the simulated scenario; more may be added later. This may be done automatically via wireless link to the peripheral units, and/or based on instructor input to the master control unit. The peripheral units may be set as a group or have reading individually calculated based on position. A time component may be used to set up and drive the scenario. At the start of the scenario (initial time), realistic readings for each type of detector may be set based on a predetermined or ad hoc scheme and over time and/or with movement of the peripheral units, each reading may change. The scenario may be location based, including the location of the detector, as determined by a global positioning system (GPS), for example, and location as wells as time information may be used by the master control unit determine readings throughout the training. Overall scenario-based group control functions may make management of multiple detectors easier for one training officer. Detector response can also be controlled by the type of hazard in this group mode, instead of or addition to manually by the training officer. Automatically determined readings may be individually overridden at the option of the instructor using the master control unit, for example, to train participants to recognize detector malfunctions or other unexpected upsets. During training, radio contact, text chat or telephone may be used to determine participant understanding of the simulated environment as reflected by the peripheral unit readings.

In another aspect, shorter range wireless signals (e.g., Bluetooth™ or WiFi) may be used to define boundaries of a simulated contaminated area. For example, a WiFi access point may broadcast a specified signal, and any client receiving the signal may simulate detection of a hazardous condition, optionally showing a hazard level in proportion to the received signal strength. Other enhancements include remote controlled valves or other devices, which can be triggered by the master control unit to simulate the appearance of fluids leaking from transport systems or containers.

Detectors controlled individually, or as a group, or as an environment group/type, may change based on time, or location or direct input. Custom environments can be created, for example by including the parameters in the following TABLE I:

| Parameters | Unit |
| --- | --- |
| Oxygen | Percent |
| H2S | ppm |
| CH4 LEL (Lower Explosive Limit) | Vol. % |
| CH4 LEL | % |
| RAM (Radioactive material) | Beta |
| RAM | Gamma |
| RAM | Alpha |
| Chlorine | ppm |
| CO | ppm |
| G (nerve agent) | ppm |
| V (nerve agent) | ppm |
| B (nerve agent) | ppm |
| H (nerve agent) | ppm |
| T (mustard gas additive) | ppm |
| Phosgene | ppm |
| Custom | (may vary) |

The system is not limited to the foregoing parameters, and may simulate detection of any substance for which a detector can be made.

Participating reams utilizing the peripheral device may obtain simulated readings on their detection instrumentation thus experiencing the critical decision making experience in real time. The peripheral display may show exactly what is determined by the master control unit. Examples of master control for three ways of implementing the hazardous materials detector simulator of the invention has been illustrated above in FIG. 1. These different ways include: direct control of an individual peripheral apparatus; group control of multiple peripheral apparatus; and control of multiple apparatus by programs or combination of programs reflecting selected environmental settings, such as for dirty bomb contamination, an oxygen deficient environment, and chlorine contamination.

The foregoing aspects and elements may be embodied in a simulator apparatus 600 removably incorporating a stand-alone wireless communication device, as shown in FIGS. 6-12. The apparatus 600 may include a housing 601 comprised of a faceplate 606 attached to a base 614 using any suitable removable fastener, for example, machine screws or clips. A portable hand-held stand-alone wireless communication device 612 (client device), for example a smartphone or hand-held tablet computer with Wi-Fi or Bluetooth capability, may be held in an interior of the housing 601 and substantially concealed thereby. A display screen 610 of the client device 612 may be revealed to an exterior of the housing 601 via an opening 601 in the upper plate 606. A sound guide 616 around the client device 612 may be removably fastened to the base 614, for redirecting sound emitted from a rear speaker of the client device 612 towards an opening in the faceplate 606. The faceplate 606 and base 614 may be molded or otherwise fabricated from any suitable structural polymer material, for example, polyurethane.

A ruggedized case 602 may surround the housing 601 for impact protection and to provide a hand grip for the assembly 600. The case 602 may comprise any suitable rubberized material, for example, a rubberized polyurethane, silicone, or rubber. Similarly, a non-slip rubberized base plate 618 may be attached to the bottom of the base 614 to improve impact resistance and grip-ability. The base plate 618 may include an flat area 626 for attachment of an adhesive label. The base plate or other components may also include a opening (not shown) into an interior of the housing 601, for example, to avoid obstructing functional components of the client device 612 such as cameras, microphone openings, ventilation openings, input ports, wireless antennae, lights, control buttons, or other components. The size and location of any such opening, if present, may therefore vary depending on the particular model of mass-produced client device 612 that the simulator apparatus 600 is designed for.

Figure 7:
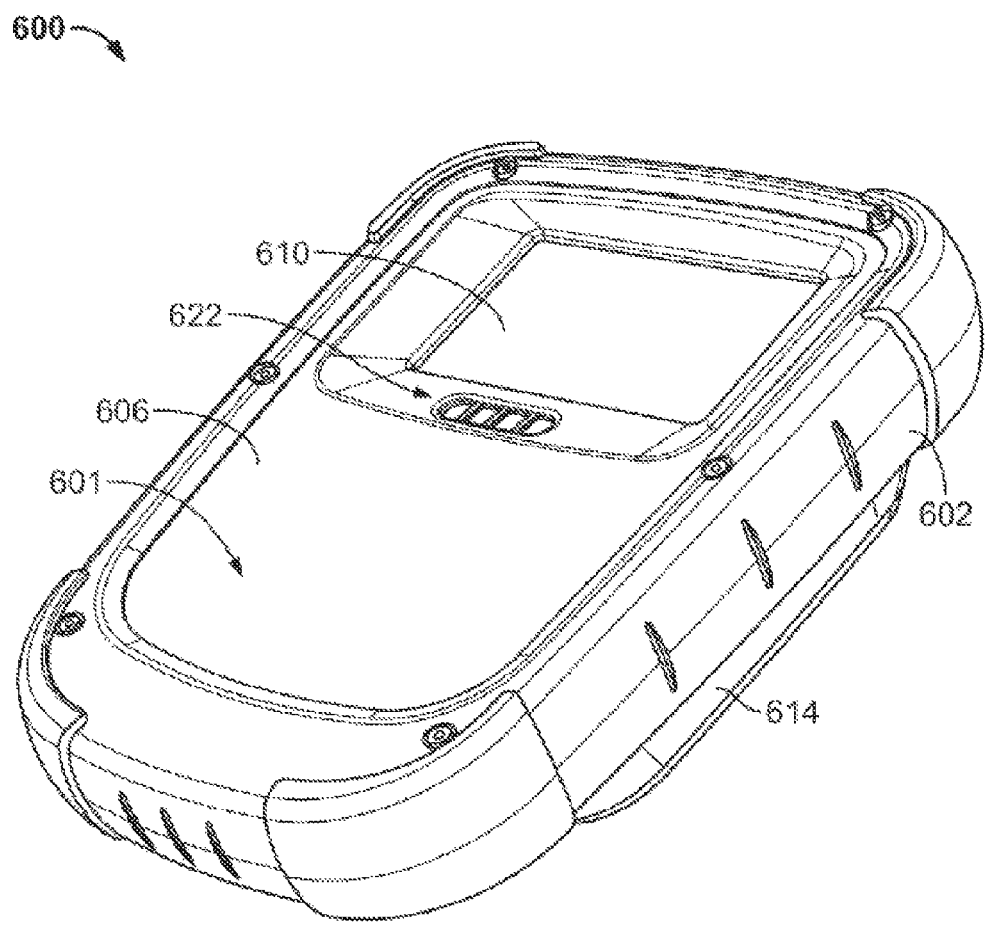
FIG. 7 shows a perspective view of the assembly shown in FIG. 6.

The simulator apparatus 600 may further include a control panel 622 on the faceplate 606 of the housing 601 (FIG. 7). The control panel 622 may include one or more keys coupled via an interface module and cable (not shown) to an input port of the client device 612. In the alternative, the control panel 622 may comprise openings permitting user access to control buttons, touchscreen portion, or other control features of the client device 612 mounted underneath the faceplate 606, or to provide an opening for sound emitted from the client device 612.

Figure 8:
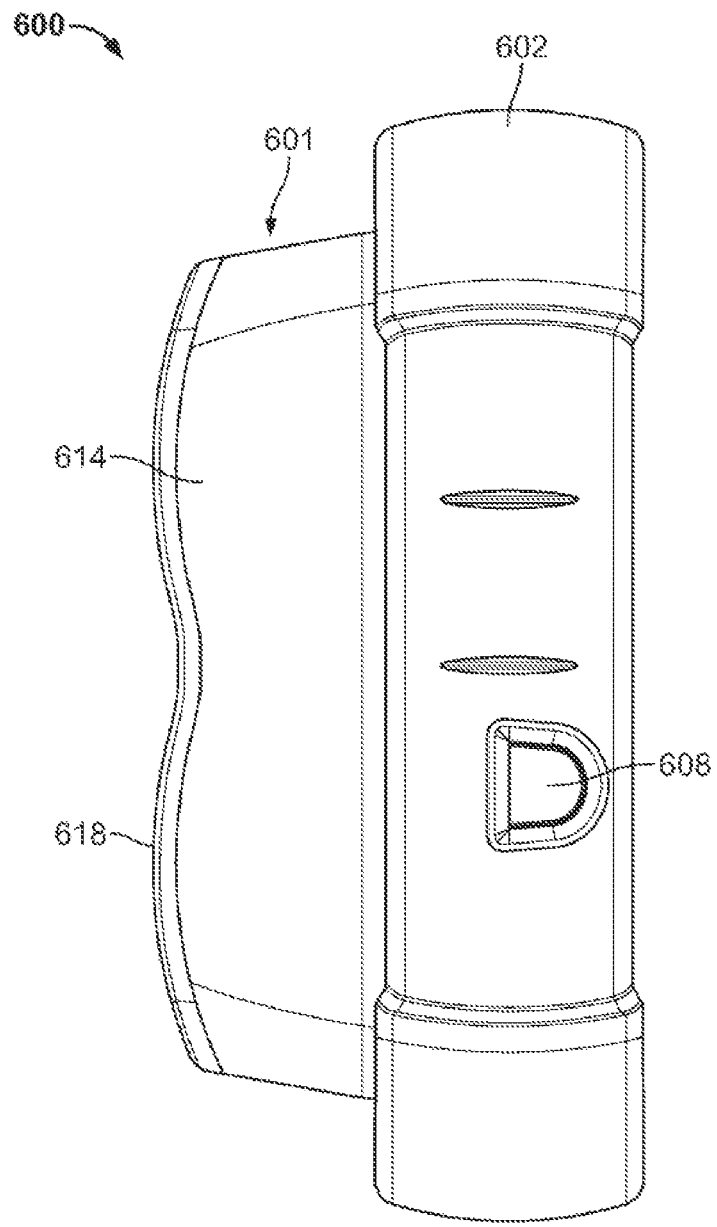
FIG. 8 shows a top edge view of the assembly shown in FIGS. 6-7.

The simulator apparatus 600 may further include a sniffer tube adaptor 608 accessible via the case 602, for enabling connection to a sniffer tube for simulating hazardous materials detection in environments requiring use of sniffer tubes (FIG. 8).

Figure 6:
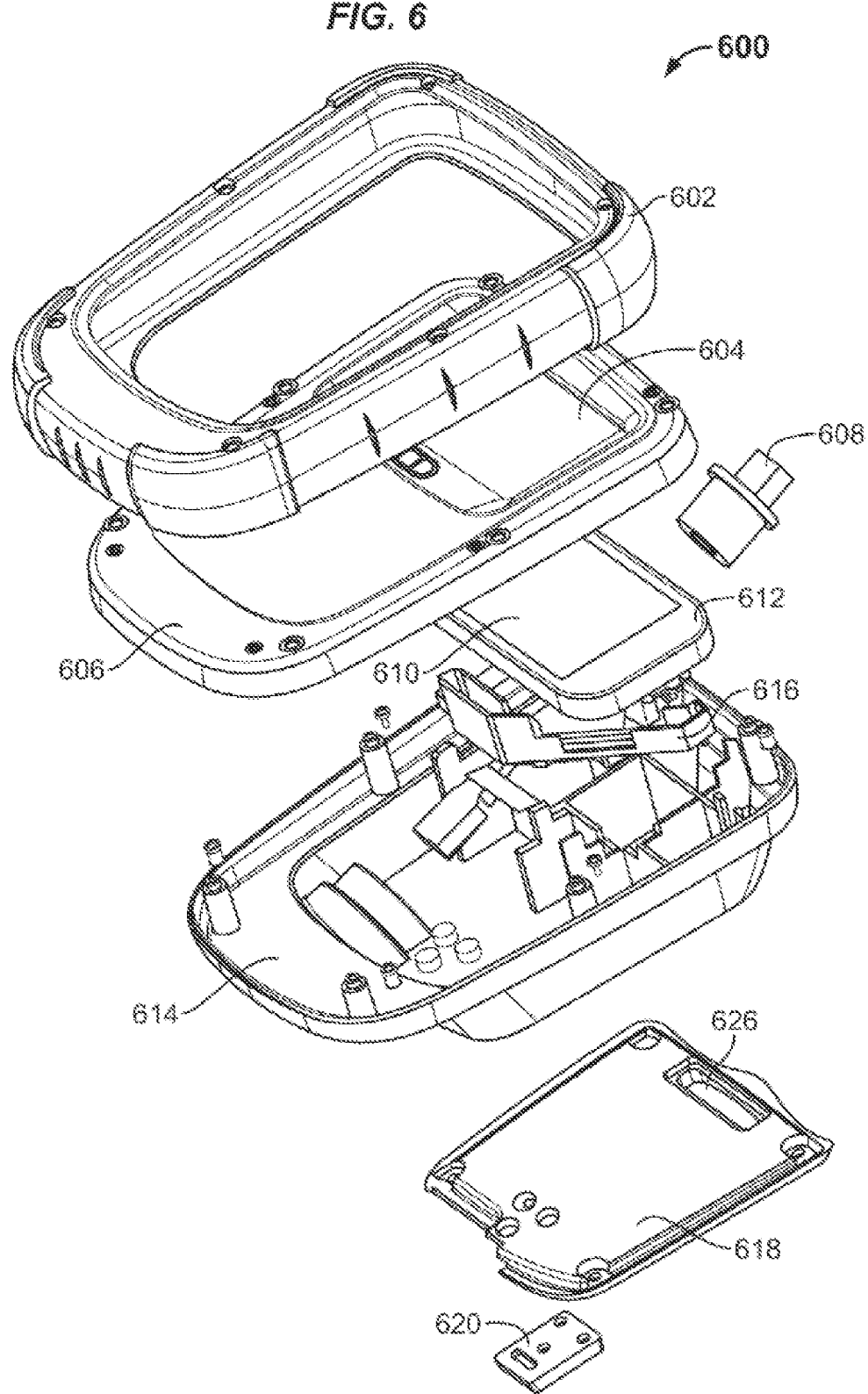
FIG. 6 is an exploded assembly drawing showing an embodiment of a simulator apparatus comprising a stand-alone communications device such as a smartphone or hand-held tablet computer enclosed, except for its display screen, inside a ruggedized housing resembling an actual HazMat detector.
Figure 9:
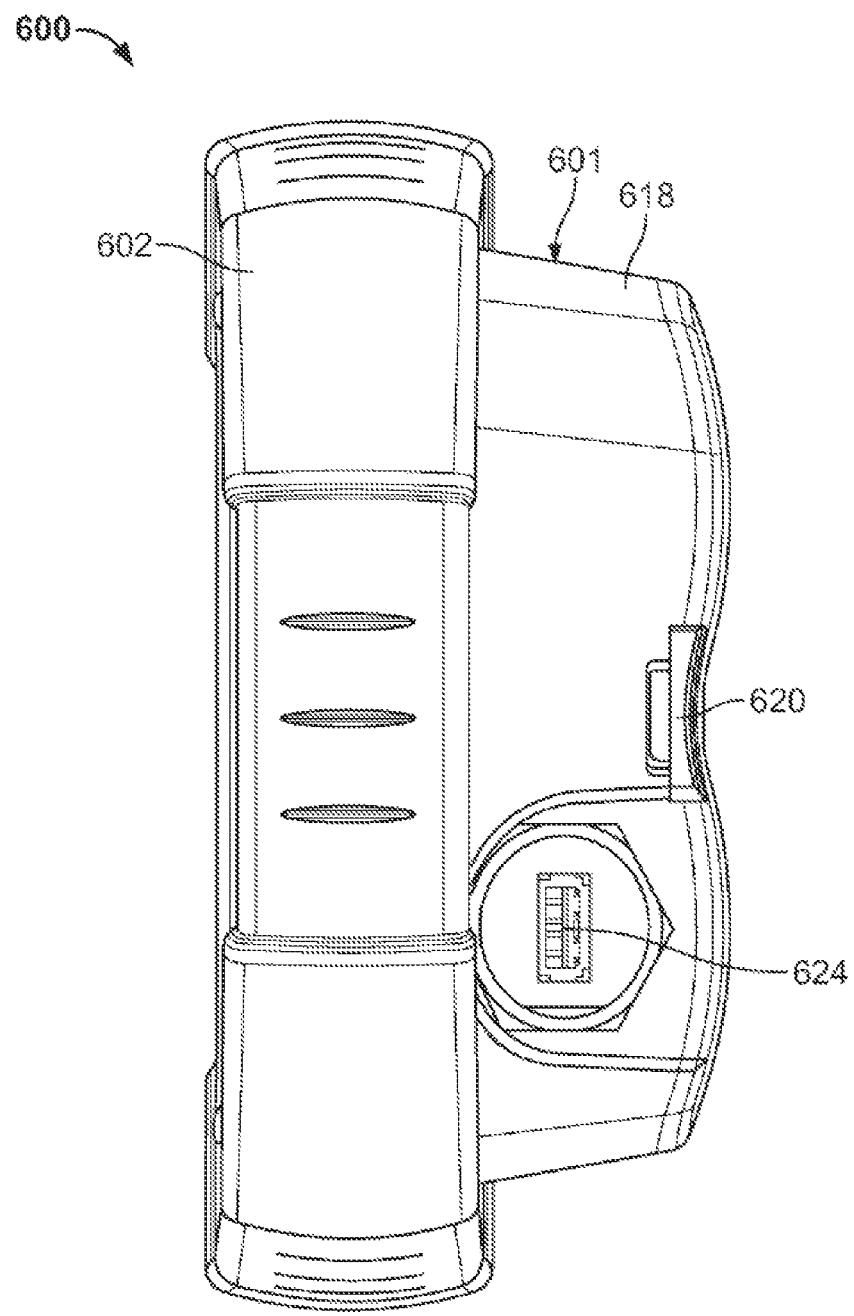
FIG. 9 shows a bottom edge view of the assembly shown in FIGS. 6-7.
Figure 10:
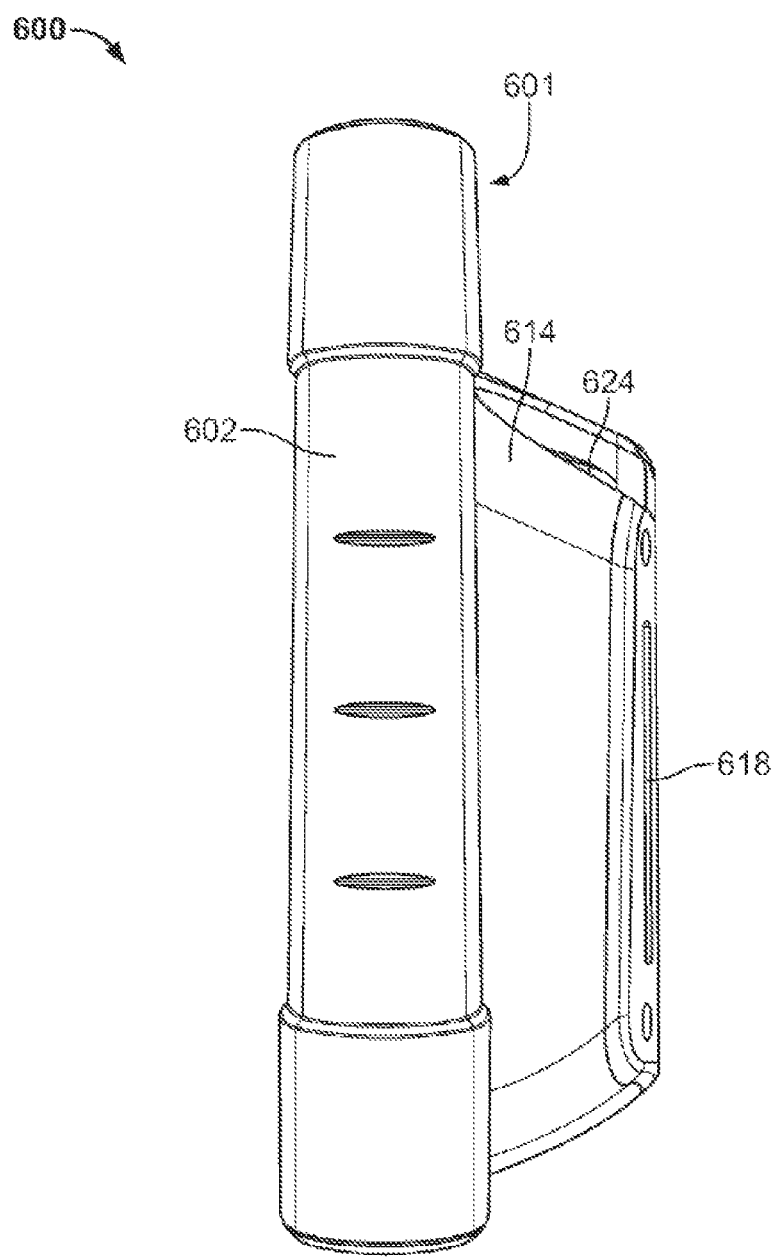
FIG. 10 shows a side view of the assembly shown in FIGS. 6-7.
Figure 11:
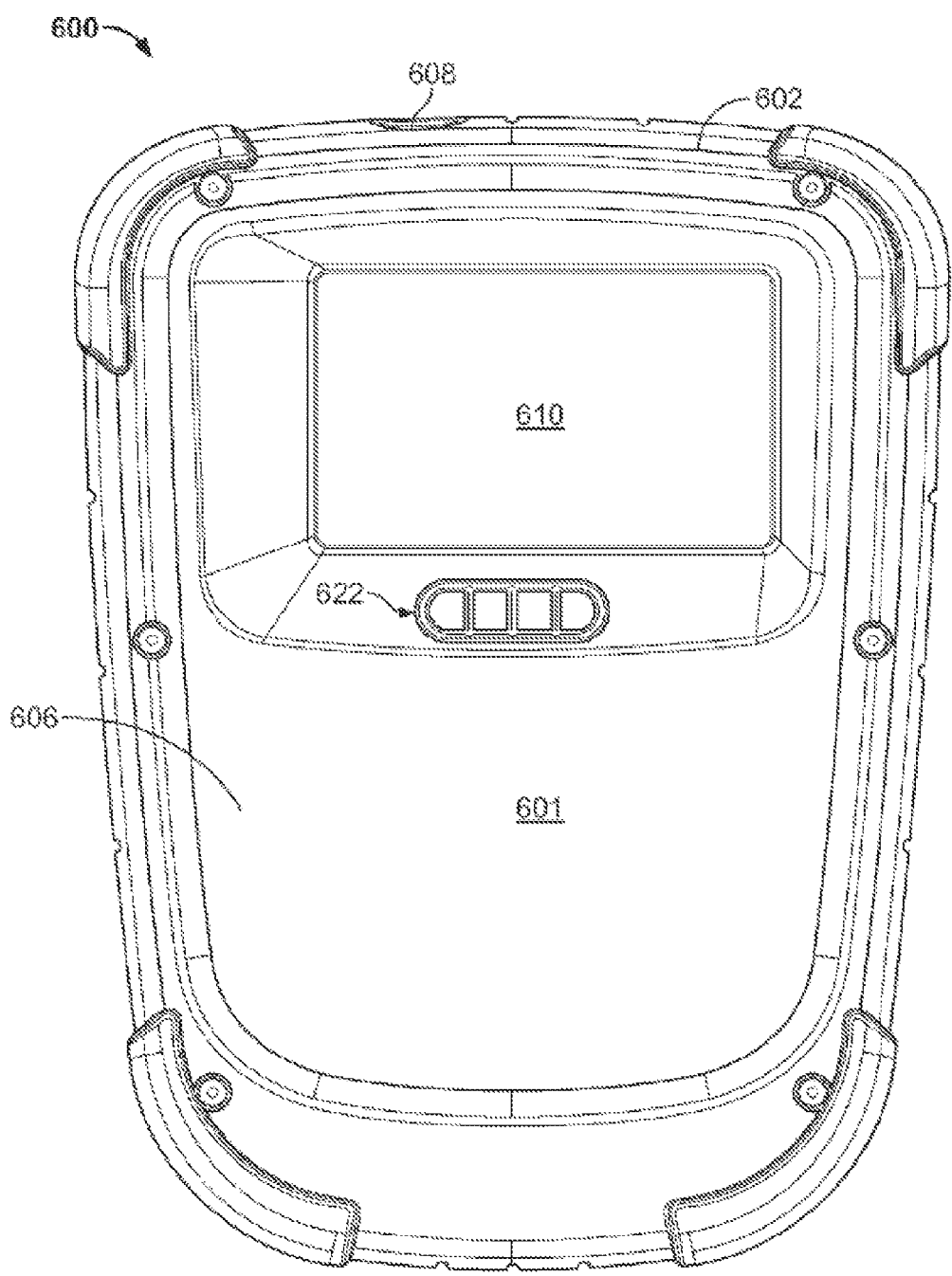
FIG. 11 shows a front plan view of the assembly shown in FIGS. 6-7.
Figure 12:
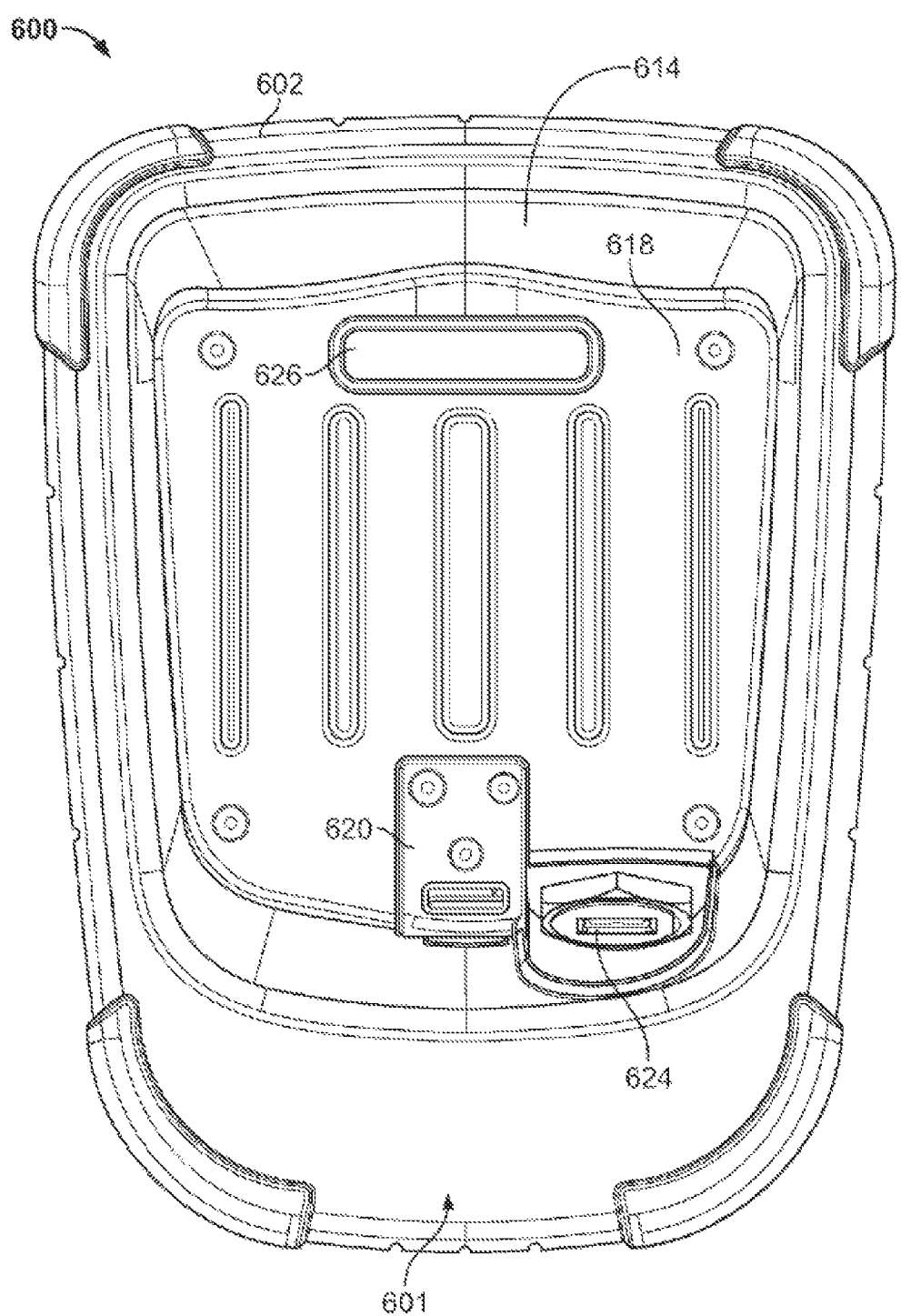
FIG. 12 shows a rear plan of the assembly shown in FIGS. 6-7.

The simulator apparatus 600 may further include a slotted strap bracket 620 attached to a lower surface of the base 618 for attaching a carrier strap (not shown) of nylon webbing or the like (FIGS. 6, 9, 10). A carrier strap may be useful to prevent accidental dropping of the simulator apparatus 600 during use.

The assembly 600 may further include a socket 624 (FIG. 9) for connecting a cable to the client device 612, for example for a battery charging unit, or for a wired data communication interface. The socket 624 may be configured for a standard connector, for example, a Universal Serial Bus (USB) connector. In the alternative, or in addition, the socket 624 may be coupled to other internal circuitry of the assembly 600, for example, to an interface module for the control panel 622.

Figure 13:
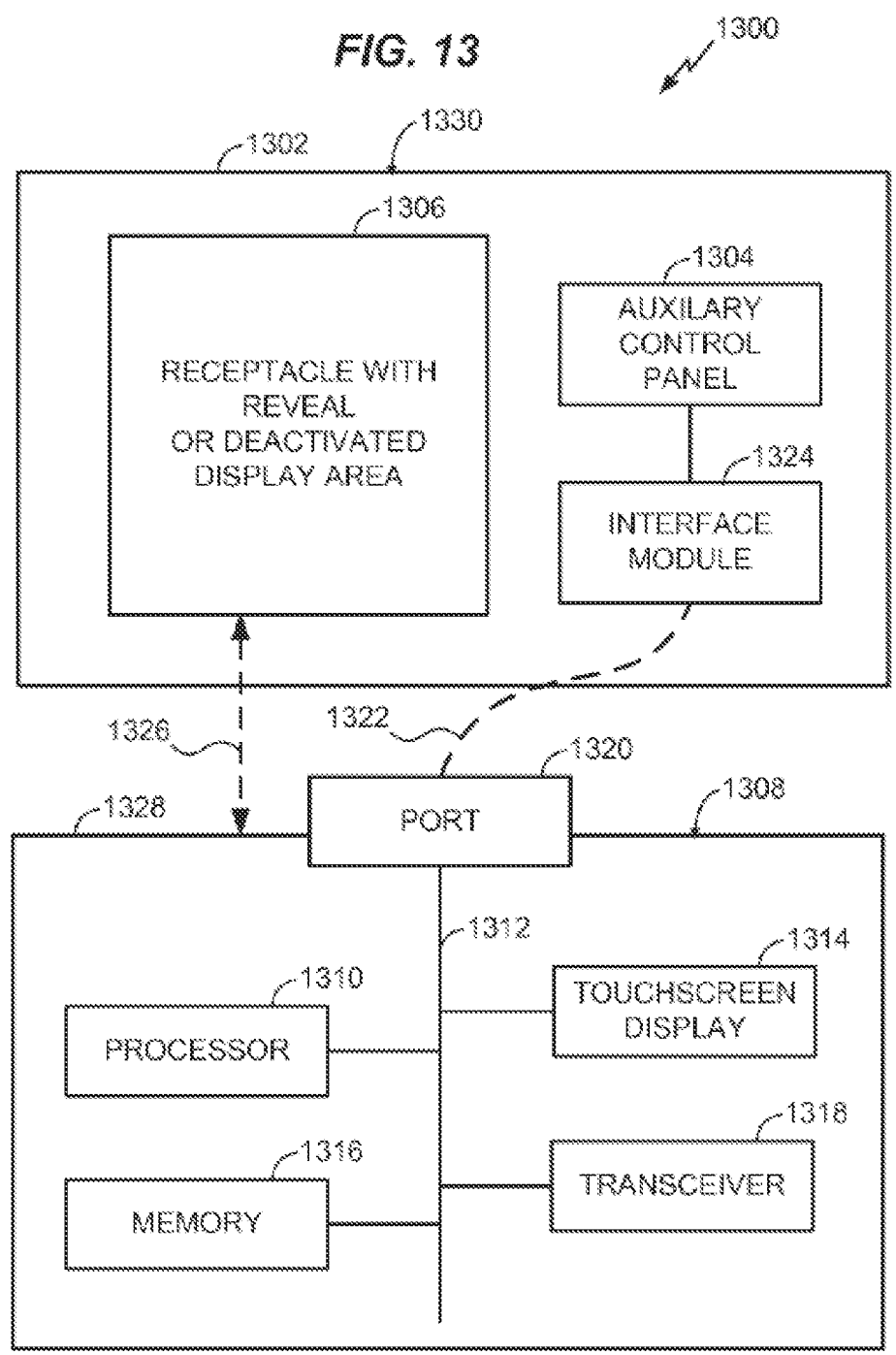
FIG. 13 is a block diagram illustrating elements and aspects of a hazardous materials detector simulator apparatus.

Further aspects of a simulator apparatus 1300 of the type illustrated by FIGS. 6-12, or in an alternative of a second type 200 illustrated by FIG. 2A, are shown schematically in FIG. 13. It should be appreciated that the elements of FIG. 13 are not drawn to scale relative to one another and do not represent a physical appearance of any component.

A self-contained client device 1308 component of the apparatus 1300 may, as mentioned above, be or include a smartphone or hand-held wireless computing device. Although components of such devices should be generally familiar to the reader, certain essential components are summarized here. The client device 1308 may include a processor 1310, for example a low power microprocessor designed for a portable device, coupled to a memory 1316 via a bus 1312 or other coupling. The memory may hold instructions, that when executed by the processor 1310, cause the client device 1308 to perform one or more operations of methods as described herein.

The client device 1308 may further include a touchscreen display 1314 coupled to the processor 1310, via which the processor 1310 may receive user input and output a display simulating a HazMat detector to a user. The client device 1308 may include one or more control buttons (not shown) on an exterior housing 1328 for controlling the touchscreen 1314 (for example, by turning it off or on) or for controlling other functions. The client device 1308 may include an input/output port 1320 coupled to the processor 1310 via a bus 1312, the port 1320 including a socket for connecting a power and/or data cable.

The client device 1308 may include a wireless transceiver 1318 coupled to the processor 1310 and associated components, for example one or more antenna. Multiple transceivers may be included for different radio technologies, for example Wi-Fi, cellular radio access technologies (e.g., GSM, LTE), and/or Bluetooth. All of the forgoing component may be substantially enclosed by the housing 1328 to form a stand-alone hand-held portable wireless communication device. The client device 1308 may include additional components as known in the art, for example a battery and charging circuit.

The simulator apparatus 1300 may further include a second component 1330. In an embodiment, the second component 1330 may be configured as primarily an empty housing 1302 resembling an actual or generic HazMat detector, for example as described above in connection with FIGS. 6-12. For example, the housing 1302 may resemble a hand-held portable hazardous material detection device (not shown) disposed around and substantially concealing the client device 1308, except for revealing the display screen 1314 on an exterior of the housing 1302 as if belonging to the hand-held portable hazardous material detection device. In such embodiments, the housing 1302 may include an interior receptacle 1306 sized for holding the client device 1308 with a reveal or opening revealing a major portion or all of the display area of the touchscreen 1314. FIG. 7 provides an example of a housing (601) resembling a ruggedized hand-held portable hazardous material detection device.

In another embodiment, the second component 1330 may be configured primarily as a functional HazMat detector, which is powered off or otherwise disabled during a training session. In such embodiments, the component 1330 may include a deactivated display screen 1306 similar in size and extent to the touchscreen 1314 of the client device 1308. One or more fasteners 1326, for example, a thumbscrew, machine screws, resilient clips or hook-and-loop material, may be used to attach the client device 1308 over the deactivated display area 1306. The one or more removable fasteners 1326 may be fixed to the housing configured for removable attachment of the apparatus over and around an electronic display screen.

In another embodiment, the second component 1330 may be configured primarily as a functional HazMat detector, which is powered on during a training session but set or switched to operate in a training mode only. In training mode, the detector capabilities are disabled and the component 1330 acts as the client device 1308 under control of the master control unit, by operating a training application module in a memory. Essentially, the client device may, depending on available hardware of the detector, be operated as a virtual client device 1308 using built-in internal hardware (e.g., processor, memory, display and transceiver) of the functional detector.

In any of the foregoing embodiments, the housing 1302 may further hold an auxiliary control panel 1304. The auxiliary panel 1304 may be or include a mechanical interface enabling a user to activate control buttons of the client device 1308 from an exterior of the housing 1302. In the alternative, or in addition, the auxiliary panel 1304 may be or include independent electro-mechanical input devices (e.g., keys, switches, rotary potentiometers, etc.) designed to mimic or resemble specialized controls of a functional HazMat detector, independently of a more generic control interface for the client device 1308. In such case, the auxiliary control panel 1304 may be coupled via an interface module 1324 and cable 1322 to the input port 1320 of the client device 1308.

The foregoing examples and details may be embodied in one or more methodologies performed by an apparatus including a simulator housing and smartphone or wireless tablet computer with an input port, display screen (optionally touchscreen), wireless interface, processor and memory. Methodologies that may be implemented in accordance with the disclosed subject matter will be better appreciated with reference to various flow charts, summarizing more detailed aspects of the methodologies described above. Although methodologies are shown and described as a series of acts/blocks for simplicity of illustration, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement methodologies described herein. It is to be appreciated that functionality associated with blocks may be implemented by software, hardware, a combination thereof or any other suitable means (e.g., device, system, process, or component).

Additionally, it should be further appreciated that certain elements of methodologies disclosed throughout this specification are capable of being stored as encoded instructions and/or data on an article of manufacture, for example, a non-transitory computer-readable medium, to facilitate storing, transporting and transferring such methodologies to various devices. Those skilled in the art will understand and appreciate that a method may alternatively be represented as a series of interrelated states or events, such as in a state diagram.

Figure 14:
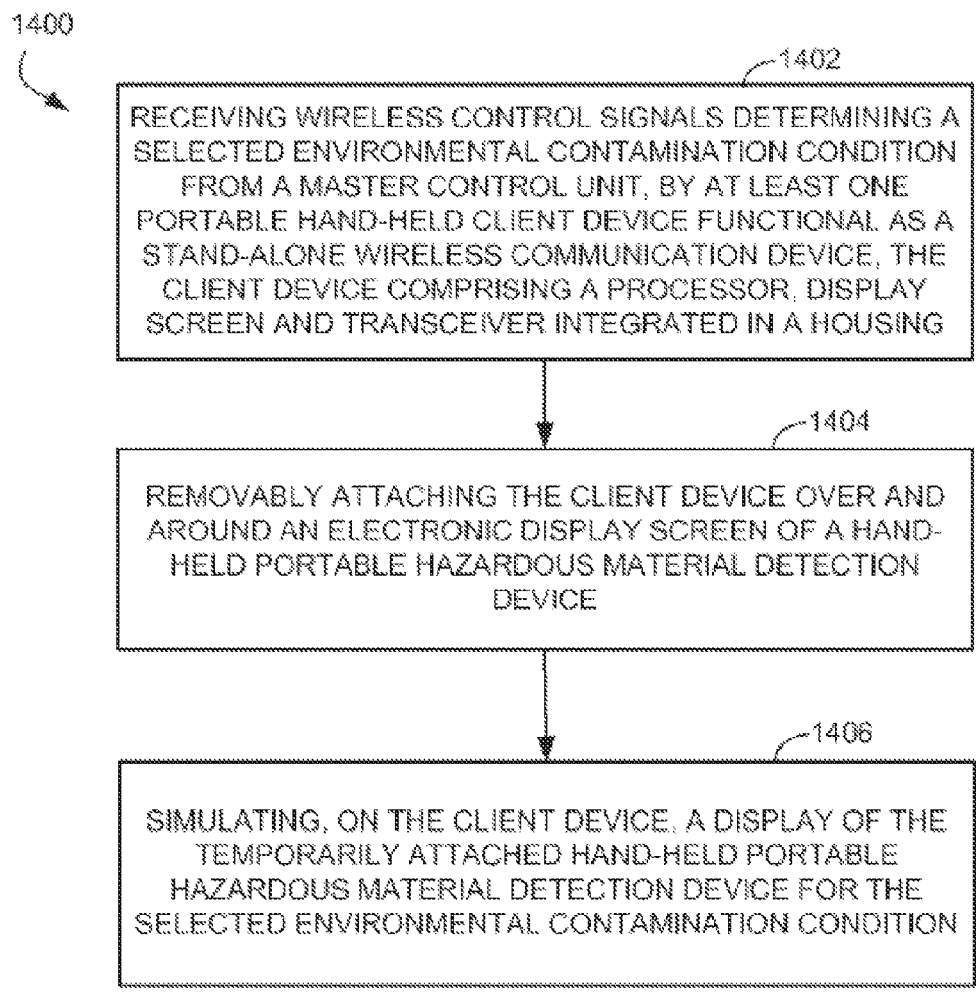
FIG. 14 is a flow chart illustrating a method for simulating a hazardous materials detector using an externally attached client device.

As shown in FIG. 14, the apparatus 1300 including a functional detector may be used to perform a method 1400 for simulating a hazardous materials detector. The method 1400 may include, at 1402, receiving wireless control signals determining a selected environmental contamination condition from a master control unit, by at least one portable hand-held client device functional as a stand-alone wireless communication device, the client device comprising a processor, display screen and transceiver integrated in a housing. The wireless control signals may be transmitted using any suitable wireless technology, for example Wi-Fi, LTE, infrared or Bluetooth. Detailed aspects of determining an environmental contamination condition described earlier in the specification may apply. The portable hand-held client device functional as a stand-alone wireless communication device may be, for example, a smartphone or Wi-Fi equipped hand-held computing device.

The method 1400 may further include, at 1404, removably attaching the client device over and around an electronic display screen of a hand-held portable hazardous material detection device. Once attached, the client device may cover all, or substantially all, of the underlying display screen so that it is no longer visible to the user/trainee. The fastening may be done using any suitable removable fastening method, some examples of which are provided herein above.

The method may further include, at 1406, simulating, on the client device, a display of the temporarily attached hand-held portable hazardous material detection device for the selected environmental contamination condition. The simulation may be performed in response to the control signals from the master control unit. In some embodiments of the method 1400, the at least one client device may include a plurality of similar client devices. In such cases, the method 1400 may further include the master control unit broadcasting the control signal to multiple ones of the plurality of similar client devices. Thus, the simulating may include simulating a plurality of different hazardous materials detector types selected by the master control unit.

In a separate aspect, the at least one client device may include a touch screen. In such embodiments, the method 1400 may further include prompting a user to respond to questions related to the selected environmental contamination condition, using the touch screen. Specific training databases may be customized by the user with subject matter-specific questions for the types of training being performed. Stock databases including question files may include, for example, basic meter operations, advanced meter operations, Confined Space, CBRNE, and other common training requirements. An optional feature may be provided enabling the instructor to edit and supply their own questions during a training session. In addition, a question-an-answer interface may be also designed with the ability for the instructor to use the questions in a first natural language (i.e. English) while the same question is presented to the client appear in a second natural language (i.e. Spanish). This may facilitate a non-bilingual instructor teaching students in other languages.

Referring to FIG. 15, the apparatus 1300 configured to include a non-functional simulated detector housing and lacking any functional detector may be used to perform a method 1500 for simulating a hazardous materials detector. The method 1500 may include, at 1502, receiving wireless control signals for a selected environmental contamination condition from a master control unit, by at least one portable hand-held client device functional as a stand-alone wireless communication device, the client device comprising a processor, display screen and transceiver integrated in a first housing. This element may be essentially the same as element 1402 of method 1400, except for its mounting interface. The method 1500 may further include, at 1503, removably inserting the client device inside a second housing resembling a hand-held portable hazardous material detection device, so that the client device is substantially concealed inside the second housing and the display screen is revealed on an exterior of the second housing as if belonging to the hand-held portable hazardous material detection device. For this step, a special simulator housing should be provided to function as the second housing, for example, the housing 601 shown in FIGS. 6-12. Once inserted into the second housing, the client device should be essentially hidden by the second housing, such that the display of the client device appears to be that of a functioning detector through a screen opening of the second housing. Detailed views of an example of this arrangement are shown in FIGS. 6-12. The inserting operation may be done prior to the training session, for example just prior to a training session by the trainer or at any prior time, for example at the factory. The method 1500 may then include simulating, on the client device, a display of a hand-held portable hazardous material detection device determined by the control signals for the selected environmental contamination condition, as previously described for other embodiments.

In other aspects, the method 1500 may include removing the client device from the second housing after the simulating is completed. Removal of the client device may be made easy for an untrained user, or may be made difficult, such as by requiring special tool or manipulation methods by a trained service technician, at the option of the designer.

In another aspect, the method 1500 may further include transmitting user input information to the master control unit, based on a user input signal from at least one of a touch-sensitive module of the display screen or a control panel held by the second housing. In some embodiments, the control panel may generate the input signal via an interface module (e.g., electrical-mechanical interface such as a keypad). In these embodiments, the method may include coupling the interface module to the client device. For example, the coupling may include removably connecting the client device to the interface module using a cable. In alternative embodiments, a wireless interface may be used.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. If implemented in software, the functions may be stored on or transmitted over as one or more instructions or code on a non-transitory computer-readable medium. Computer-readable media may include both computer storage media and non-transitory communication media including any medium that facilitates transfer of a computer program from one place to another. A storage media may be any available media that can be accessed by a general purpose or special purpose computer. By way of example, and not limitation, such non-transitory computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor.

The previous description of the disclosed embodiments is provided to enable any person skilled in the art to make or use the embodiments disclosed. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A simulator apparatus for training people to perform hazard detection, comprising:
 a display screen;
 a processor coupled to a wireless receiver and to the display screen, the processor configured to wirelessly receive control signals from a master control unit;
 a memory coupled to the processor, the memory holding instructions for simulating operation of a simulated hazard detection apparatus in response to the control signals;
 a first housing enclosing the display screen, processor, wireless receiver and memory in a hand-held portable client device that functions as a stand-alone wireless communications device; and
 a second housing resembling the simulated hazard detection apparatus disposed around and substantially concealing the client device except for revealing the display screen on an exterior of the second housing as if belonging to the simulated hazard detection apparatus.

2. The apparatus of claim 1, wherein the second housing holds the client device in a manner enabling removal of the client device from the second housing after operation thereof.

3. The apparatus of claim 1, further comprising at least one module for receiving a user input signal, the at least one module selected from a touch-sensitive module of the display screen or a control panel held by the second housing.

4. The apparatus of claim 3, further comprising an interface module processing the user input signal from the at least one module and generating information based thereon.

5. The apparatus of claim 4, further comprising a coupling between the interface module and the client device.

6. The apparatus of claim 5, wherein the coupling comprises a cable.

7. The apparatus of claim 1, wherein the operation of the simulated hazard detection apparatus comprises detection of a selected environmental contamination condition.

8. The apparatus of claim 1, wherein the second housing resembles the simulated hazard detection apparatus comprising a hand-held portable hazardous material detection device.

9. The apparatus of claim 1, wherein the second housing resembles the simulated hazard detection apparatus comprising a portable detector.

10. The apparatus of claim 1, wherein the memory holds further instructions for receiving a signal from a master control unit for controlling the display screen.

11. The apparatus of claim 1, wherein the memory holds further instructions for displaying questions on the display screen in response to the signal from the master control unit.

12. A method for simulating operation of a hazard detector, the method comprising:
  receiving wireless control signals for a selected hazardous environmental condition from a master control unit, by at least one portable hand-held client device functional as a stand-alone wireless communication device, the client device comprising a processor, display screen and transceiver integrated in a first housing;
  removably inserting the client device inside a second housing resembling the hazard detector, so that the client device is substantially concealed inside the second housing and the display screen is revealed on an exterior of the second housing as if belonging to the hazard detector; and
  simulating, on the client device, a display determined by the control signals for the selected environmental condition.

13. The method of claim 12, further comprising removing the client device from the second housing after the simulating is completed.

14. The method of claim 12, further comprising transmitting user input information to the master control unit, based on a user input signal from at least one of a touch-sensitive module of the display screen or a control panel held by the second housing.

15. The method of claim 12, further comprising the control panel generating the input signal via an interface module.

16. The method of claim 15, and further comprising coupling the interface module to the client device.

17. The method of claim 12, further comprising displaying test questions on the display screen, in response to the control signals.

18. The method of claim 12, wherein the receiving comprises receiving the control signals via a cellular radio access technology.

19. The method of claim 12, wherein the simulating comprises simulating a display of a hazardous material detection device.

20. The method of claim 19, wherein the simulating comprises displaying a contamination value received from the master control unit.

* * * * *